Figure 1:
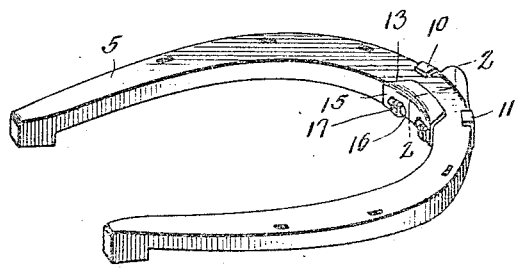

J. W. HENDERSON.
HORSESHOE CALK.
APPLICATION FILED FEB. 7, 1917.

1,245,101.

Patented Oct. 30, 1917.

WITNESS

INVENTOR
J. W. Henderson,
BY Victor J. Evans
ATTORNEY

UNITED STATES PATENT OFFICE.

JAMES W. HENDERSON, OF ATLANTA, GEORGIA.

HORSESHOE-CALK.

1,245,101.

Specification of Letters Patent.

Patented Oct. 30, 1917.

Application filed February 7, 1917. Serial No. 147,183.

*To all whom it may concern:*

Be it known that I, JAMES W. HENDERSON, a citizen of the United States, residing at Atlanta, in the county of Fulton and State of Georgia, have invented new and useful Improvements in Horseshoe-Calks, of which the following is a specification.

The present invention relates to improvements in horse shoe calks, and the primary object of the invention is to produce a calk of this character which may be easily and quickly positioned upon any ordinary construction of horse shoes and removed therefrom as occasion requires.

With the above and other objects in view the improvement resides in the construction, combination and arrangement of parts set forth in the following description and falling within the scope of the appended claims.

Figure 2:
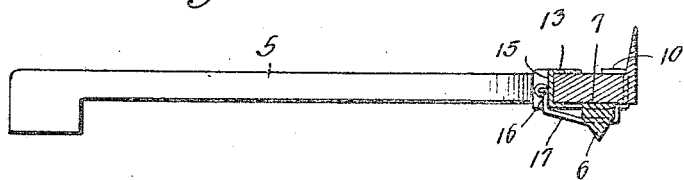
Figure 3:
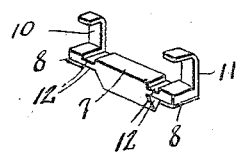
Figure 4:
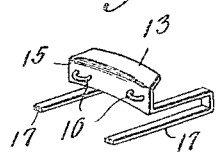

In the drawing:

Figure 1 is a perspective view illustrating a calk constructed in accordance with my invention, arranged upon the toe portion of a horse shoe, Fig. 2 is a sectional view approximately on the line 2—2 of Fig. 1, Fig. 3 is a perspective view of the calk proper, and Fig. 4 is a similar view of the holding member for the calk.

In the drawing, the numeral 5 designates a horse shoe of any ordinary construction, and while I have illustrated my improvement as applied only to the toe of the shoe it is to be understood that the same can, if desired, be also applied to the heel portion of the shoe. The calk proper is indicated by the numeral 6 and comprises the usual sharpened member having its upper face straight, and this straight face is designed to be arranged upon the under or outer face of the horseshoe 5. To the sides of the calk 6, in a line with the aforesaid outer straight face 7 thereof is integrally formed laterally extending members 8, and also integrally formed with the said members 8 are hooks 10 and 11, the said hooks being designed to engage with the outer edge of the horseshoe and to overlie the upper surface of the said shoe, as clearly illustrated in Figs. 1 and 2 of the drawings. The lateral members 8 upon both their upper and lower surfaces and in a line with the sides of the calk 6 are grooved or channeled, as indicated by the numerals 12, the purpose of which arrangement will presently be described.

The holding member comprises an angle plate 13, the upper element of the said plate being designed to rest upon the upper surface of the shoe diametrically opposite the calk and the said member is also disposed between the inturned ends of the hooks 10 and 11 of the said calk. The vertical plate 15 of the member 13 is provided with outwardly extending eyes 16—16 and has its lower edges at the corners thereof formed with bendable substantially U-shaped straps 17—17 which are adapted to pass below and in a line with the underface of the horse shoe and through the upper grooves in the laterally extending members 8 of the calk, thence against the outer edge of the said lateral members and through the lower grooves and from thence to be passed upwardly over the vertical element of the angle plate 13, through the eyes 16 and bent around the said eyes and by this means it will be noted that the calk is effectively retained upon the toe.

By reference to Fig. 1 of the drawings it will be noted that the upper members of the hooks upon the calk are arranged one to each of the sides of the tip of the shoe which results in preventing the lateral movement of the calk upon the shoe.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. In a device for the purpose set forth, a calk having lateral extensions provided with angularly arranged hooks designed to engage one edge of a horseshoe, a holder member comprising an angle plate designed to engage the opposite edge of the horseshoe provided with eyes, longitudinally extending bendable straps formed upon one of the edges of the angle plate, said straps adapted to be passed around the lateral extensions upon the calk and to be passed through the eyes of the angle member and bent thereover, as and for the purpose set forth.

2. A detachable calk for horseshoes comprising a calk member having an upper flat face designed to rest against one of the faces of the shoe, lateral members extending from the calk at the said flat face thereof, hook members formed upon the lateral members and designed to engage with one of the edges and upon one of the faces of the shoe, the said lateral member having its opposite faces channeled in a line with the sides of the calk, a holder member comprising an angle plate designed to be arranged upon one of the faces and to contact with one of the edges of the shoe, eye members formed upon the angle member, bendable straps upon the lower edge of the angle member and adapted to be passed over the underface of the shoe through the upper channels in the lateral members of the calk, over one of the edges of the said lateral members, through the lower channels in the said members, and to be extended within and over the eyes of the holder member.

In testimony whereof I affix my signature.

JAMES W. HENDERSON.